United States Patent
Fechner

(10) Patent No.: US 8,388,018 B2
(45) Date of Patent: Mar. 5, 2013

(54) AIRBAG ARRANGEMENT FOR A VEHICLE OCCUPANT RESTRAINT SYSTEM AND METHOD FOR PRODUCING AN AIRBAG ARRANGEMENT

(75) Inventor: Tobias Fechner, Aschaffenburg (DE)

(73) Assignee: Takata-AG, Aschaffenburg (DE)

( * ) Notice: Subject to any disclaimer, the term of this patent is extended or adjusted under 35 U.S.C. 154(b) by 0 days.

(21) Appl. No.: 13/244,081

(22) Filed: Sep. 23, 2011

(65) Prior Publication Data

US 2012/0061947 A1    Mar. 15, 2012

Related U.S. Application Data

(63) Continuation of application No. PCT/EP2010/054926, filed on Apr. 15, 2010.

(30) Foreign Application Priority Data

Apr. 16, 2009  (DE) .......................... 10 2009 017 919

(51) Int. Cl.
*B60R 21/201* (2011.01)
*B60R 21/233* (2006.01)
*B60R 21/237* (2006.01)

(52) U.S. Cl. ....................... 280/728.2; 280/729; 280/731

(58) Field of Classification Search .................. 280/729, 280/731, 728.2, 732, 728.1, 730.2, 730.1; *B60R 21/201, 21/233, 21/237, 21/20*
See application file for complete search history.

(56) References Cited

U.S. PATENT DOCUMENTS

| | | | |
|---|---|---|---|
| 5,096,222 A | 3/1992 | Komerska et al. | |
| 5,421,607 A | 6/1995 | Gordon | |
| 5,454,588 A | 10/1995 | Rose | |
| 5,605,347 A | 2/1997 | Karlow et al. | |
| 5,658,008 A | 8/1997 | Herrmann et al. | |
| 5,765,867 A * | 6/1998 | French | 280/743.2 |
| 5,791,682 A | 8/1998 | Hiramitsu et al. | |
| 6,209,906 B1 | 4/2001 | DeWitt | |
| 7,866,688 B2 | 1/2011 | Basten | |
| 7,900,954 B2 | 3/2011 | Sahm | |
| 2002/0135160 A1 | 9/2002 | Lorenz | |
| 2003/0209888 A1 | 11/2003 | Davis et al. | |
| 2005/0230938 A1 | 10/2005 | Thomas et al. | |
| 2007/0108752 A1 | 5/2007 | Eckert et al. | |
| 2007/0138768 A1 * | 6/2007 | Miwa et al. | 280/728.2 |

(Continued)

FOREIGN PATENT DOCUMENTS

| DE | 101 14 208 A1 | 5/2002 |
|---|---|---|
| DE | 20 2005 011 878 U1 | 11/2005 |

(Continued)

OTHER PUBLICATIONS

International Search Report in PCT/EP2010/054926 dated Aug. 17, 2010.

(Continued)

*Primary Examiner* — Joseph Rocca
*Assistant Examiner* — Keith Frisby
(74) *Attorney, Agent, or Firm* — Foley & Lardner LLP

(57) ABSTRACT

An airbag arrangement for a vehicle occupant restraint system is provided. The airbag arrangement comprises an airbag package which includes an airbag which can be inflated to protect a vehicle occupant as well as a sleeve in which the airbag is vacuum-packaged. The sleeve comprises a first sleeve part and a second sleeve part. The first sleeve part and the second sleeve part each include at least one flange portion. The two flange portions are connected with each other and initially protrude from the remaining airbag package, after they have been connected with each other. The two flange portions are at least partly folded such that they extend along an outer surface of the remaining airbag package.

24 Claims, 3 Drawing Sheets

U.S. PATENT DOCUMENTS

| | | |
|---|---|---|
| 2007/0138769 A1 | 6/2007 | Miwa et al. |
| 2007/0145724 A1 | 6/2007 | Miwa et al. |
| 2007/0267850 A1 | 11/2007 | Eckert et al. |
| 2008/0111351 A1 | 5/2008 | Eckert et al. |
| 2009/0014987 A1 | 1/2009 | Weigand et al. |
| 2009/0194977 A1 | 8/2009 | Sahm |
| 2010/0038888 A1 | 2/2010 | Hamels |

FOREIGN PATENT DOCUMENTS

| | | |
|---|---|---|
| DE | 10 2006 013 990 A1 | 9/2007 |
| DE | 20 2007 007 885 U1 | 10/2007 |
| DE | 10 2006 034 740 A1 | 1/2008 |
| DE | 10 2007 001 476 A1 | 7/2008 |
| EP | 1 481 855 A1 | 12/2001 |
| WO | WO-2006/050719 A1 | 5/2006 |
| WO | WO-2008/130286 A1 | 10/2008 |

OTHER PUBLICATIONS

Office Action in U.S. Appl. No. 13/317,250 dated Jan. 9, 2012.
Office Action in U.S. Appl. No. 13/317,250 dated May 22, 2012.

* cited by examiner

AIRBAG ARRANGEMENT FOR A VEHICLE OCCUPANT RESTRAINT SYSTEM AND METHOD FOR PRODUCING AN AIRBAG ARRANGEMENT

CROSS-REFERENCE TO A RELATED APPLICATION

This application is a continuation of International Patent Application Number PCT/EP2010/054926, filed on Apr. 15, 2010, which claims priority of German Patent Application Number 10 2009 017 919.4, filed on Apr. 16, 2009.

BACKGROUND

The present invention relates to an airbag arrangement for a vehicle occupant restraint system and to a method for producing an airbag arrangement.

From the prior art airbag packages are known, which include an airbag vacuum-packaged in a sleeve. The sleeve in particular is formed of a bottom web, which includes a recess for arranging a gas generator, and of a top web welded to the bottom web. In such airbag packages the problem can arise that upon deployment of the airbag a strong expansion of the bottom web occurs and the same tears, before the airbag exits from the sleeve through the top web. The tearing of the bottom web can lead to the fact that film pieces are flung into the vehicle interior.

SUMMARY

The problem to be solved by the present invention consists in improving the safety of airbag packages.

According to an exemplary embodiment of the invention an airbag arrangement for a vehicle occupant restraint system is provided, comprising
- an airbag package which includes an airbag which can be inflated to protect a vehicle occupant as well as a sleeve in which the airbag is vacuum-packaged, wherein
- the sleeve comprises a first and a second sleeve part,
- the first sleeve part and the second sleeve part each include at least one flange portion,
- the two flange portions are connected with each other,
- the flange portions initially protrude from the remaining airbag package, after they have been connected with each other, and
- the two flange portions are at least partly folded such that they extend along an outer surface of the remaining airbag package.

Thus, the two sleeve parts are connected with each other via the flange portions for producing an evaluable sleeve. A "flange portion" in particular is a planar lug which protrudes for example from the remaining sleeve part. In one variant, at least one of the flange portions has a closed (circumferential) geometry. However, this is not absolutely necessary, but non-circumferential, e.g. tab-like structures also can form a flange portion. Furthermore, it is of course also possible that a plurality of flange portions, in particular spaced from each other, of the first and/or the second sleeve part are provided.

After connecting them, the two flange portions according to the invention are not removed (shortened) as usual down to the connecting point (e.g. in the form of a welding seam or a welding spot), but are folded such that they extend along an outer surface of the remaining airbag package. An "outer surface" of the remaining airbag package is formed by a side of the sleeve facing away from the airbag. "Remaining airbag package" is understood to be the airbag package minus the flange portions. After folding the flange portions, the flange portions themselves, so to speak, form an outer surface of the (complete) airbag package in the region in which they extend along the outer surface of the remaining airbag package.

Due to the fact that the flange portions extend along an outer surface of the airbag package, the deploying airbag presses both against the first and against the second sleeve part, so that both sleeve parts absorb force upon deployment of the airbag. This acts against a load of only one of the sleeve parts and in particular against a separation of this sleeve part due to the load. Thus, e.g. for the case that one of the two sleeve parts is formed in the form of a deep-drawn bottom web, action can be taken against a too strong load and thus against tearing of this bottom web in a first phase of the airbag deployment.

In accordance with an exemplary development of the invention, the folded flange portion of the first sleeve part extends between the outer surface of the remaining airbag package and the folded flange portion of the second sleeve part, wherein the folded flange portion of the first sleeve part in particular rests against the outer surface of the airbag package. For example, the flange portions also are arranged such that they rest against each other after being folded.

Furthermore, the two flange portions also can be fixed on the outer surface of the airbag package, i.e. they are connected with the outer surface of the remaining airbag package via fastening means. The fastening means for example comprise an adhesive or welded joint. In particular, also only one of the two flange portions can directly be connected with the remaining airbag package, while the other flange portion is not or only indirectly fixed at the airbag package via this flange portion (directly connected with the airbag package).

According to another exemplary aspect of the invention the first sleeve part surrounds the airbag on a side which faces a gas generator for inflating the airbag. According to this variant the first sleeve part forms a receptacle for the airbag. In addition, the second sleeve part can surround the airbag on a side which faces away from a gas generator for inflating the airbag, for example it covers an opening formed in the first sleeve part for inserting the airbag into the first sleeve part. Moreover, the airbag package also can include a recess for accommodating a gas generator, which in particular is formed in the first sleeve part (e.g. in the form of an indentation).

In another exemplary variant of the invention the airbag package is approximately cuboid, wherein before folding the flange portions extend approximately vertical to a side wall of the airbag package and after connecting are folded such that they extend along the side wall, wherein the flange portions can also be connected with the side wall of the airbag package.

The invention is of course not limited to a certain geometry of the airbag package. In principle, the airbag package can have any geometry, wherein the airbag arrangement according to the invention can be used e.g. in a passenger or driver airbag module.

In another exemplary aspect of the invention, the airbag arrangement has a housing in which the airbag package is accommodated. In particular, the folded flange portions extend between the outer surface of the (remaining) airbag package and an inner surface of the housing.

The remaining flange portions in particular are connected with each other via a (for example seam-shaped) adhesive or welded joint. In addition, the two sleeve parts according to another exemplary embodiment of the invention each are formed in the form of a film, wherein the initially separate films are connected with each other, in order to form the airbag sleeve. For example, the first and/or the second sleeve part is a deep-drawn film, which can be formed e.g. for accommodating a gas generator.

The invention also relates to a steering wheel of a motor vehicle with an airbag arrangement as described above.

Furthermore, the invention comprises a method for producing an airbag arrangement for a vehicle occupant restraint system, with the following steps:

arranging an airbag in a first sleeve part;
connecting a flange portion of the first sleeve part with a flange portion of a second sleeve part for forming a sleeve in which the airbag is arranged;
evacuating the sleeve, so that sleeve and airbag form an airbag package;
folding at least a part of the two flange portions, so that they extend approximately along an outer surface of the remaining airbag package.

BRIEF DESCRIPTION OF THE DRAWINGS

The invention will subsequently be explained in detail by means of exemplary embodiments with reference to the Figures.

DETAILED DESCRIPTION

Figure 1:
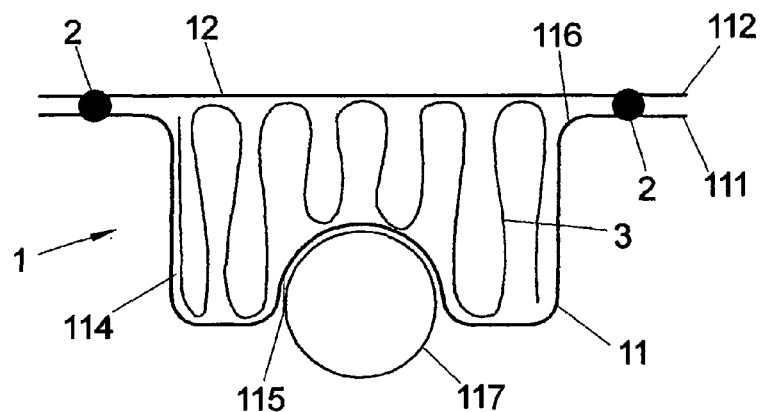
FIG. 1 shows a conventional airbag package.

The conventional airbag package 1 shown in FIG. 1 includes a first sleeve part in the form of a deep-drawn bottom web 11 and a second sleeve part in the form of a top web 12, which are connected with each other via welding seams 2. The films 11, 12 connected with each other form a sleeve in which an airbag 3 is vacuum-packaged.

Connecting bottom web and top web 11, 12 is effected via flange portions 111, 112, which are formed by the bottom and top webs, respectively. Before connecting them via the welding seams 2, the flange portions 111, 112 protrude from the remaining airbag package, wherein the remaining airbag package (i.e. the airbag package without the flange portions) is formed e.g. substantially cuboid. The flange portions 111, 112 protrude approximately vertical to a side wall of the remaining airbag package.

More precisely, the bottom web 11 forms a receptacle 114 in which the airbag 3 is arranged. The top web 12, however, is formed substantially planar and closes an opening 116 of the receptacle 114 formed by the bottom web, wherein the flange portion 112 of the top web protrudes beyond the opening 116 and surrounds the same e.g. like an edge. The top web in particular is designed such that it tears or swings open upon deployment of the airbag, in order to provide for a passage of the airbag.

In the airbag package shown in FIG. 1, the originally present flange portions have largely been removed already, i.e. down to the welding seams 2, so that only short portions of the flange portions still protrude beyond the welding seams 2.

In the deep-drawn bottom web 11 of the airbag package a recess 115 also is provided, which serves for accommodating a gas generator 117, in particular in the form of a tubular gas generator. Thus, the bottom web 11 forms a side of the remaining airbag package, which faces a gas generator arranged in the recess 115.

Figure 2:
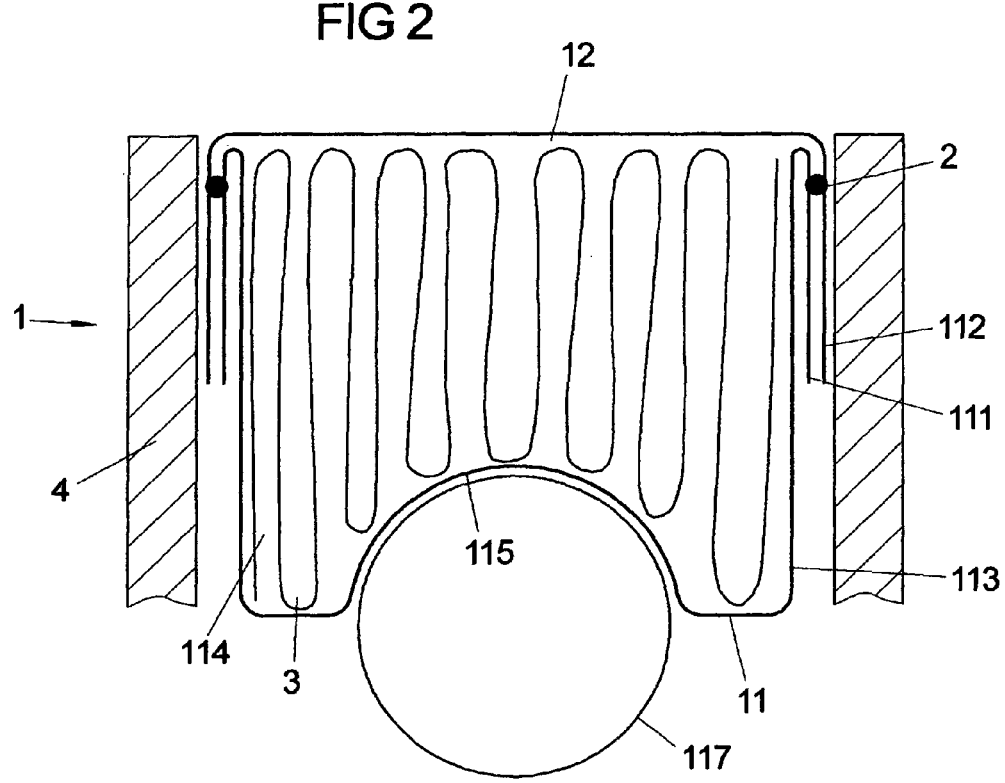
FIG. 2 shows an airbag package of an airbag arrangement according to an exemplary embodiment of the invention.

FIG. 2 shows an airbag arrangement according to the invention, which includes an airbag package 1 which except for the flange portions 111, 112 corresponds to the one of FIG. 1. In contrast to FIG. 1, the flange portions 111, 112 are not shortened, but folded together with the welding seams 2 such that they extend along an outer surface 113 of the remaining airbag package.

The airbag arrangement of FIG. 2 in addition comprises a housing 4 in which the airbag package 1 is arranged. The airbag package is arranged in the housing 4 such that the folded flange portions 111, 112 extend between the outer surface 113 of the (remaining) airbag package and an inner surface of the housing 4, wherein they extend substantially parallel to each other.

The housing 4 can also be formed in the form of a gas generator carrier to which the gas generator and/or the airbag package are attached. However, a gas generator carrier separate from the housing 4 can also be provided.

It is also conceivable that the folded flange portions 111, 112 are fixed on the outer surface of the remaining airbag package, e.g. by means of an adhesive or welding seam, or are clamped between the housing 4 and the outer surface of the airbag package. Such fixation, however, is not absolutely necessary, but it may be sufficient that the flange portions are arranged between the remaining airbag package and the housing with such a length that the flange portions are prevented from slipping out again.

In addition, it should be noted that the region of the flange portions which includes the welding seams 2 need not necessarily be folded as well. It is also possible that only a shorter, outer part of the flange portions each is folded and arranged along the outer surface of the remaining airbag package. In other words, the region with the welding seams is not folded, i.e. the folding lines along which the flange portions are folded do not extend between the remaining airbag package and the welding seams, but on a side of the welding seams which faces away from the remaining airbag package.

It should also be noted that in dependence on the geometry of the airbag package and the flange portions, a single, e.g. substantially continuous (circumferential) welding seam can also be provided instead of a plurality of welding seams.

Figure 3:
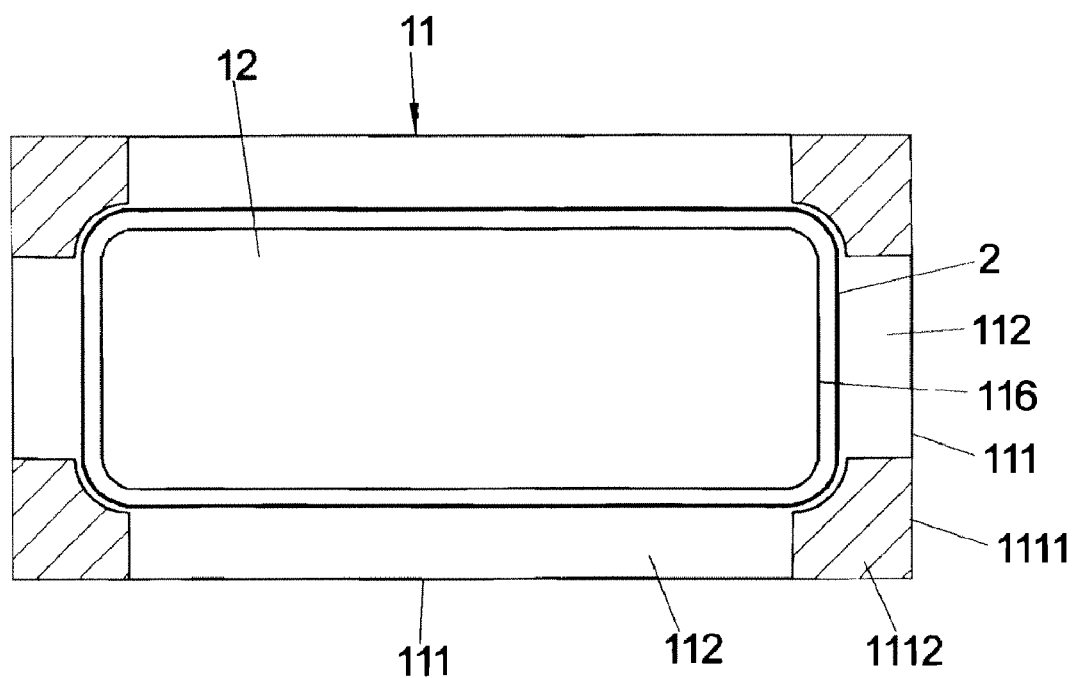
FIG. 3 shows a top view of an airbag package of an airbag arrangement according to a further exemplary embodiment of the invention.

FIG. 3 relates to an airbag package 1 of an airbag arrangement according to a further exemplary embodiment of the invention, wherein the airbag package is shown from above, i.e. with a view to a first sleeve part in the form of a top web 12.

The approximately rectangular top web 12 covers an opening 116 in a second sleeve part in the form of a bottom web 11, wherein initially a continuous flange portion of the top web 12 protrudes beyond the opening 116 and surrounds the same like an edge. Below the flange portion of the top web 12 a flange portion of the bottom web 11 extends, wherein the two flange portions are connected with each other by means of a welding seam 2 extending around the opening 116.

Before the flange portions are folded downwards, i.e. towards the bottom web 11 arranged below the top web 12, corner regions 1111, 1112 of the two circumferential flange portions are cut out or removed, in order to simplify folding. By cutting out or removing the corner regions a plurality of tab-like flange portions 111, 112 are formed, which before folding each protrude from one of the side walls of the remaining airbag package and after folding each extend along one of the side walls of the airbag package.

Figure 4:
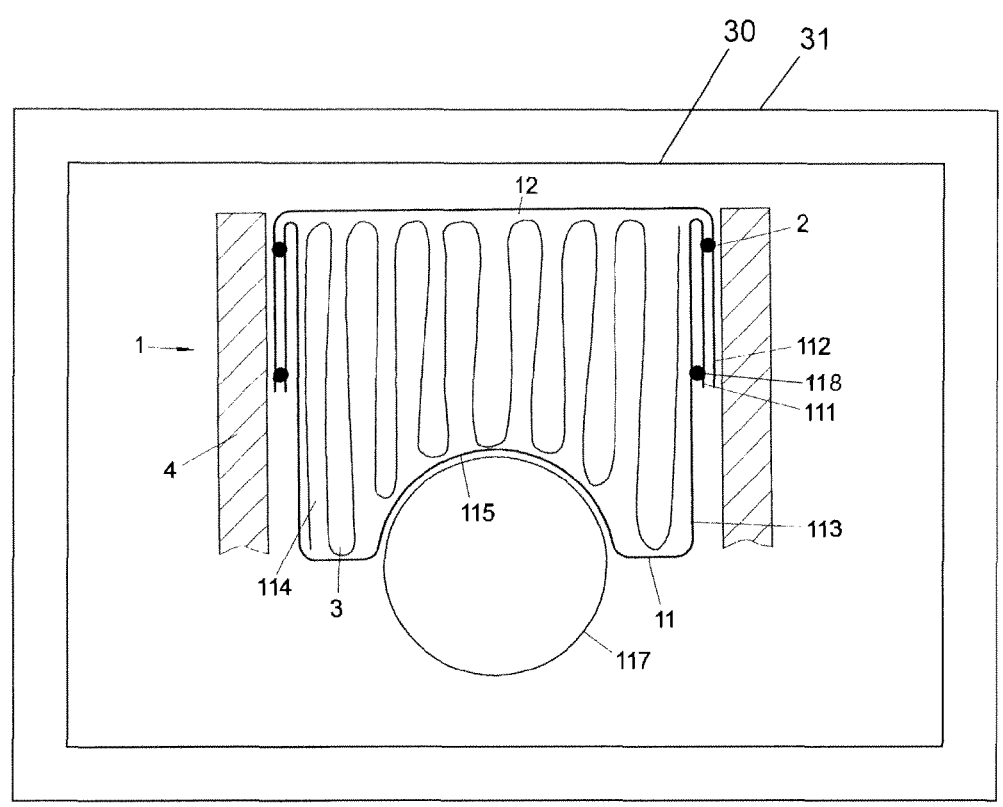
FIG. 4 schematically shows an airbag package of an airbag arrangement in a steering wheel of a motor vehicle according to an exemplary embodiment of the invention.

FIG. 4 schematically shows an airbag package 1 of an airbag arrangement in a steering wheel 30 of a motor vehicle 31 according to an exemplary embodiment of the invention. FIG. 4 also shows the two flange portions 111, 112 can be fixed on the outer surface 113 of the airbag package, i.e. they are connected with the outer surface 113 of the remaining airbag package via fastening means 118. The fastening means 118, for example, may comprise an adhesive or welded joint. Also only one of the two flange portions can be directly connected with the remaining airbag package, while the other flange portion is not or is only indirectly fixed at the airbag package via the flange portion directly connected with the airbag package.

The invention claimed is:

1. An airbag arrangement for a vehicle occupant restraint system, comprising:
   an airbag package which includes an airbag which is inflatable so as to protect a vehicle occupant and a sleeve in which the airbag is vacuum-packaged,
   wherein the sleeve comprises a first sleeve part and a second sleeve part,
   wherein the first sleeve part and the second sleeve part each include at least one flange portion,
   wherein the flange portions of the first and second sleeve parts are connected with each other and initially protrude from a remaining airbag package, after the flange portions of the first and second sleeve parts have been connected with each other,
   wherein the flange portions of the first and second sleeve parts are at least partly folded such that the flange portions of the first and second sleeve parts extend along an outer surface of the remaining airbag package, and
   wherein the flange portions of the first and second sleeve parts are fixed to the outer surface of the remaining airbag package or are clamped between a housing and the outer surface of the remaining airbag package.

2. The airbag arrangement according to claim 1, wherein the folded flange portion of the first sleeve part extends between the outer surface of the remaining airbag package and the folded flange portion of the second sleeve part.

3. The airbag arrangement according to claim 1, wherein the folded flange portion of the first sleeve part rests against the outer surface of the remaining airbag package.

4. The airbag arrangement according to claim 1, wherein the flange portions of the first and second sleeve parts are fixed on the same outer surface of the remaining airbag package.

5. The airbag arrangement according to claim 1, wherein the flange portions of the first and second sleeve parts rest against each other.

6. The airbag arrangement according to claim 1, wherein the first sleeve part surrounds the airbag on a side which faces a gas generator for inflating the airbag.

7. The airbag arrangement according to claim 1, wherein the second sleeve part surrounds the airbag on a side which faces away from a gas generator for inflating the airbag.

8. The airbag arrangement according to claim 1, wherein the airbag package includes a recess for accommodating a gas generator.

9. The airbag arrangement according to claim 1, wherein the remaining airbag package is formed approximately cuboid.

10. The airbag arrangement according to claim 9, wherein the flange portions of the first and second sleeve parts extend along a side face of the airbag package.

11. The airbag arrangement according to claim 1 wherein the first sleeve part forms a receptacle for the airbag.

12. The airbag arrangement according to claim 11, wherein the second sleeve part covers an opening of the first sleeve part, through which the airbag is brought into the receptacle.

13. The airbag arrangement according to claim 1, wherein the airbag package is accommodated in the housing.

14. The airbag arrangement according to claim 13, wherein the folded flange portions of the first and second sleeve parts extend between the outer surface of the remaining airbag package and the housing.

15. The airbag arrangement according to claim 1, wherein the flange portions of the first and second sleeve parts are connected with each other via an adhesive or welded joint.

16. The airbag arrangement according to claim 1, wherein at least one of the first and second sleeve parts is a deep-drawn film.

17. A steering wheel of a motor vehicle with an airbag arrangement according to claim 1.

18. The airbag arrangement according to claim 1, wherein the flange portions of the first and second sleeve parts are fixed to the outer surface of the remaining airbag package by a fastening means.

19. The airbag arrangement according to claim 1, wherein the flange portions of the first and second sleeve parts are fixed to the outer surface of the remaining airbag package by an adhesive or a welded joint.

20. The airbag arrangement according to claim 1, wherein the flange portions of the first and second sleeve parts are at least partly folded from the remaining airbag package at folded connections, and
   wherein the flange portions of the first and second sleeve parts are directly fixed to the outer surface of the remaining airbag package at a location that is a non-zero distance away from the folded connections.

21. A method for producing an airbag arrangement for a vehicle occupant restraint system, comprising:
   arranging an airbag in a first sleeve part;
   connecting a flange portion of the first sleeve part with a flange portion of a second sleeve part for forming a sleeve in which the airbag is arranged;
   evacuating the sleeve, so that the sleeve and the airbag form an airbag package;
   folding at least a part of each of the flange portions of the first and second sleeve parts such that the flange portions of the first and second sleeve parts extend approximately along an outer surface of the remaining airbag package; and
   performing one of fixing the flange portions of the first and second sleeve parts to the outer surface of the remaining airbag package and clamping the flange portions of the first and second sleeve parts between a housing and the outer surface of the remaining airbag package.

22. The method according to claim 21, wherein the flange portions of the first and second sleeve parts are fixed to the outer surface of the remaining airbag package by a fastening means.

23. The method according to claim 21, wherein the flange portions of the first and second sleeve parts are fixed to the outer surface of the remaining airbag package by an adhesive or a welded joint.

24. The method according to claim 21, wherein the flange portions of the first and second sleeve parts are at least partly folded from the remaining airbag package at folded connections, and
   wherein the flange portions of the first and second sleeve parts are directly fixed to the outer surface of the remaining airbag package at a location that is a non-zero distance away from the folded connections.

* * * * *